United States Patent Office 3,455,961
Patented July 15, 1969

3,455,961
SYNTHESIS OF 2,3-DIHYDRO-2,2,4-TRIMETHYL-7-BENZOFURANOL
Harry W. Weber, Jr., Baltimore, Md., assignor to FMC Corporation, New York, N.Y., a corporation of Delaware
No Drawing. Filed Feb. 23, 1966, Ser. No. 529,249
Int. Cl. C07d 5/34; A61k 27/00
U.S. Cl. 260—346.2        13 Claims

ABSTRACT OF THE DISCLOSURE

This specification discloses a process for the synthesis of 2,3-dihydro-2,2,4-trimethyl-7-benzofuranol comprising the steps of (a) acetylating m-cresol to form m-cresol acetate, (b) rearranging m-cresol acetate to form 2-hydroxy-4-methylacetophenone, (c) reacting 2-hydroxy-4-methylacetophenone with a methallyl halide to form 2-methallyloxy-4-methylacetophenone, (d) rearranging and cyclizing, in one or two steps, 2-methallyloxy-4-methylacetophenone to form 2,3 - dihydro - 2,2,4-trimethyl-7-acetylbenzofuran, (e) oxidizing 2,3 - dihydro - 2,2,4-trimethyl-7-acetylbenzofuran to form 2,3-dihydro-2,2,4-trimethyl-7-acetoxybenzofuran, and (f) hydrolyzing the 2,3-dihydro-2,2,4-trimethyl - 7 - acetoxybenzofuran to 2,3-dihydro-2,2,4-trimethyl-7-benzofuranol.

---

This invention relates to a novel method for the preparation of 2,3 - dihydro-2,2,4-trimethyl-7-benzofuranol, and, more particularly, to a method of preparing said compound by a reaction sequence starting with meta-cresol as the basic raw material.

2,3-dihydro-2,2,4-trimethyl-7-benzofuranol is the precursor of the insecticidal compound 2,3-dihydro-2,2,4-trimethyl-7-benzofuranyl N - methylcarbamate, described in U.S. patent application Ser. No. 403,324, filed Oct. 12, 1964. As indicated therein, 2,3-dihydro-2,2,4-trimethyl-7-benzofuranol can be prepared from 4-methylpyrocatechol, but the product is impure, consisting of a mixture of isomers which are not readily separable. Prior to the development of the present process, no appreciable amounts of pure 2,2,4-trimethyl isomer had been obtained.

Prior to the discovery of the present reaction sequence, very great difficulty had been encountered in attempting to prepare the final product, 2,3-dihydro-2,2,4-trimethyl-7-benzofuranol, in any form other than the mixture of isomers, and particularly in admixture with the isomer wherein the third methyl group is in the 5-position. Since the isomer with the third methyl group in the 4-position forms a pesticide (as the N-methylcarbamate) which is very much more active than the carbamate of the 5-methyl isomer, the advantages from the viewpoint of degree of biological activity per unit of mass, of preparing a relatively pure 4-methyl compound, are substantial.

By the process of the present invention, 2,3-dihydro-2,2,4-trimethyl-7-benzofuranol may be prepared from inexpensive starting materials in high yields, relatively free from isomers. This novel reaction sequence comprises the steps of (a) acetylating m-cresol to form m-cresol acetate, (b) rearranging m-cresol acetate to form 2-hydroxy-4-methylacetophenone, (c) reacting 2-hydroxy-4-methylacetophenone with a methallyl halide to form 2-methallyloxy - 4 - methylacetophenone, (d) rearranging and cyclizing, in one or two steps, 2-methallyloxy-4-methylacetophenone to form 2,3-dihydro-2,2,4-trimethyl-7-acetylbenzofuran, (e) oxidizing 2,3-dihydro-2,2,4-trimethyl-7-acetylbenzofuran to form 2,3-dihydro-2,2,4-trimethyl-7-acetoxybenzofuran, and (f) hydrolyzing the 2,3-dihydro-2,2,4-trimethyl-7-acetoxybenzofuran to 2,3-dihydro-2,2,4-trimethyl-7-benzofuranol. In spite of the fact that the reaction sequence (a) through (f) was not specifically known heretofore, and that it is not obvious that several of these reactions can be carried out, excellent overall yields of 2,3-dihydro-2,2,4-trimethyl-7-benzofuranol have been obtained by the process of this invention.

The 2-hydroxy-4-methylacetophenone is a known compound and is described by Rosenmund and Schnurr (Annalen 460, 56 (1928)). It can be prepared by acetylating m-cresol with acetic anhydride in the presence of a mineral acid such as sulfuric acid. The resultant m-cresol acetate is then rearranged under anhydrous conditions with aluminum chloride as catalyst to form this hydroxyacetophenone.

The 2-methallyl ether of 4-methylacetophenone is prepared by heating 2-hydroxy-4-methylacetophenone with a methallyl halide in the presence of an acid acceptor in accordance with the equation:

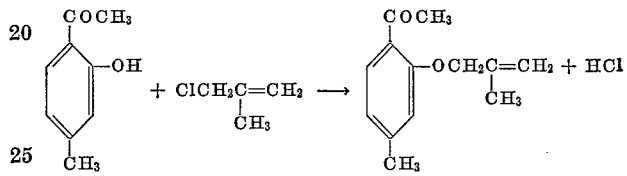

Suitable acid acceptors include alkali metal hydroxides and carbonates. Although methallyl bromide and iodide are more reactive, methallyl chloride is preferred for economic reasons. The reaction proceeds by way of the phenol salt. If desired, the phenol salt may be preformed prior to reaction with the methallyl halide, by reaction of the 2-hydroxy-4-methylacetophenone with a base, such as an alkali metal hydroxide or carbonate.

This etherification reaction is carried out at elevated temperatures, and may be conducted at the atmospheric boiling point of the reaction mixture or at superatmospheric pressures. Temperatures up to about 150° C. or higher may be employed. Organic solvents such as methanol, dioxane and dimethylformamide may be used in the preparation of 2 - methallyloxy-4-methylacetophenone, as well as low molecular weight ketones such as acetone or methyl ethyl ketone; or the reaction may advantageously be carried out in aqueous medium, in a heterogeneous reaction system.

2-methallyloxy-4-methylacetophenone can be caused to rearrange and to cyclize, either in separate steps or in essentially one step, by heating at elevated temperatures to effect the rearrangement, and in the presence of a catalyst to effect the cyclization, in accordance with the following equations:

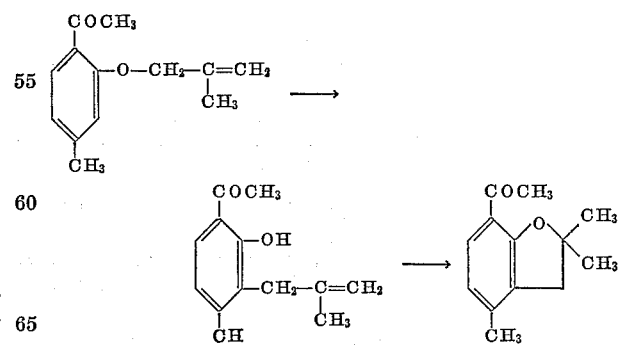

These reactions are readily carried out at temperatures in the range of about 150–225° C., with a preferred temperature range of about 175–215° C. At temperatures substantially higher than about 250° C., degradation of these organic compounds may occur; and at temperatures substantially lower than about 150° C., the reaction rate is too slow for convenient operation. The rearrangement reaction is rapid and exothermic, and the cyclization reaction is somewhat slower. These reactions may be carried out at atmospheric pressure, or, alternatively, at partially reduced pressure so that the reactants and reaction products will reflux at a somewhat lower reaction temperature. Although high-boiling solvents, such as o-dichlorobenzene, may be used, they are not necessary and it is preferred to operate without a solvent.

In general, a catalyst is necessary to effect cyclization to form 2,3-dihydro-2,2,4-trimethyl-7-acetylbenzofuran. Effective catalysts include acidic materials such as pyridine hydrochloride, phosphoric acid, formic acid, ferric chloride and magnesium chloride. Excellent results have been obtained with catalysts such as ferric chloride and magnesium chloride, at levels of 0.1–10% and, preferably, about 1% by weight of the methallylphenol. The catalyst may be omitted during the rearrangement reaction, if it is desired to carry out the rearrangement and cyclization steps separately.

Purification of the crude 2,3-dihydro-2,2,4-trimethyl-7-acetylbenzofuran may be accomplished, if desired, by fractional distillation after removal of the catalyst by standard procedures. The crude material is, however, sufficiently pure to be used directly in the next step.

In the next step of the process sequence, the 2,3-dihydro-2,2,4-trimethyl-7-acetylbenzofuran is converted to the acetoxy derivative, by treatment with an active-oxygen compound in accordance with the equation:

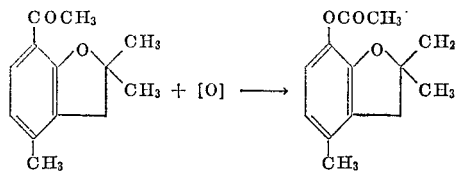

Among suitable active-oxygen compounds for this reaction are peroxides and the per-acids, e.g., hydrogen peroxide, perbenzoic acid and peracetic acid. The reaction is exothermic and is preferably carried out in solvent media unaffected by the oxidizer. Cooling of the reaction vessel has proven adequate for controlling the reaction.

The final hydrolysis step is carried out by standard procedures, in accordance with the equation:

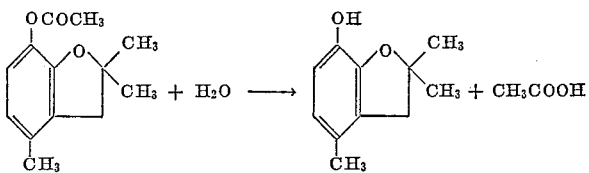

Standard hydrolysis procedures generally include conducting an hydrolysis with a strong base at elevated temperatures. The hydrolysis is preferably carried out in aqueous alkali. Heat is useful to promote the reaction. Upon completion of the hydrolysis the reaction medium may be concentrated by distillation, followed by neutralization with acid of the residual solution and extraction of the product with an organic solvent. The 2,3-dihydro-2,2,4-trimethyl-7-benzofuranol may be purified by distillation under reduced pressure.

The process of this invention is illustrated by the following examples. The examples are not intended to limit the invention in any way. All materials and conditions equivalent to those shown are intended to be included within the scope of this invention.

Example 1.—Acetylation of m-cresol to m-cresyl acetate

A flask was charged with 108.0 g. of m-cresol and 107.9 g. of acetic anhydride. There was no evidence of reaction until one drop of concentrated sulfuric acid was added; within seconds the temperature rose to 91° C. When the exotherm was completed, external heat was applied and the acetic acid by-products and the excess of acetic anhydride were fractionated from the crude product at atmospheric pressure to a final vapor temperature of 212° C. The residual product was washed twice with 100 ml. of water to remove the trace of catalyst and vacuum dried. Final product weight: 140 g.; purity by vapor phase chromatography: 99+ percent.

Example 2.—Rearrangement of m-cresyl acetate to 2-hydroxy-4-methylacetophenone

A slurry of 12.0 g. of aluminum chloride in 25 ml. of o-dichlorobenzene was heated to 165° C. and 10.0 g. of m-cresyl acetate was added uniformly over a 12-minute period. The evolution of gas, observed throughout the addition, continued as the reaction was heated to 180° C. for 15 minutes. The product was recovered by steam distillation. Assay of the steam distilled product by vapor phase chromatography (in ortho-dichlorobenzene) indicated a yield of 71% of 2-hydroxy-4-methylacetophenone. The product was fractionated at 17 mm. Hg pressure. The fraction collected at a vapor temperature of 125.5–127° C. was chromatographically pure material.

Example 3.—Methallylation of 2-hydroxy-4-methylacetophenone to 2-methallyloxy-4-methylacetophenone The reaction flask was thoroughly purged with nitrogen, then charged with 100 g. of 2-hydroxy-4-methylacetophenone, 160 g. of distilled water and 83 g. of methallyl chloride. The mixture was heated to 70° C. and 70 g. of 50% sodium hydroxide was added over a two-hour period. The mixture was refluxed for two hours during which time the temperature rose to 100° C. After cooling the reaction mixture to 50° C., 50 ml. of hexane was added. The organic phase was removed and washed with water. The washes, and the original aqueous phase, were extracted with hexane. The organic fractions were combined, filtered and vacuum stripped to about 100° C. at 7 mm. Hg. Assay of the residue by vapor phase chromatography indicated the 2 - methallyloxy - 4 - methylacetophenone content was 79%.

The stripped residue was fractionated at 0.2 mm. Hg pressure to obtain a chromatographically pure fraction, collected over the vapor temperature range of 106–110° C.

REARRANGEMENT-CYCLIZATION OF 2-METHALLYLOXY - 4 - METHYLACETOPHENONE TO 2,3-DIHYDRO - 2,2,4 - TRIMETHYL - 7 - ACETYLBENZOFURAN

Example 4.—Single step process

The reaction unit was charged with 395 g. 2-methallyloxy-4-methylacetophenone and 3.95 g. of freshly fused and powdered magnesium chloride. Heat was applied by oil bath and the temperature was raised to 195° C. over a period of approximately two hours. The mixture was maintained at 195–200° C. for five hours and then was cooled. The product, which crystallized on cooling to room temperature, was collected on a filter and washed with 10–15 ml. of hexane. The snow-white crystalline solid, 2,3 - dihydro - 2,2,4-trimethyl-7-acetylbenzofuran melted 79–80° C.

Example 5.—Two-step process

Twenty grams of 2-methallyloxy-4-methylacetophenone were dissolved in 50 g. of dimethylaniline and the mixture was heated to 165° C. and maintained for 4 hours at 165–175° C. After cooling, the mixture was dissolved in 175 ml. of ether and washed with equal portions of dilute hydrochloric acid. The ether solution was then washed with water and dried over sodium sulfate. The ether was then removed by distillation and the 3-methallyl-2-hydroxy-4-methylacetophenone was recovered. To this was added 1 g. of freshly fused and powdered magnesium chloride. The mixture was stirred and heated to 185° C. at which temperature it was maintained for 5 hours. After cooling, hexane was added to dissolve the product and the solution was filtered free of the insoluble magnesium chloride. The cyclized product, which crystallized from the hexane solution on cooling to room temperature, was filtered and washed with small portions of hexane. The snow-white crystalline product 2,3 - dihydro - 2,2,4-trimethyl-7-acetylbenzofuran melted 79–80° C.

Example 6.—Oxidation of 2,3-dihydro-2,2,4-trimethyl-7-acetylbenzofuran to 2,3 - dihydro - 2,2,4-trimethyl-7-acetoxybenzofuran Ten grams of crystalline 2,3-dihydro-2,2,4-trimethyl-7-acetylbenzofuran were dissolved in 200 ml. of carbon tetrachloride to which was then added 125 ml. of peracetic acid. The reaction mixture was permitted to stand without agitation for 41 hours. The mixture was then washed 3 times at room temperature with 160 ml. of 5% sodium hydroxide. The organic phase was filtered and then washed twice with 160 ml. of water. Vapor phase chromatography of the carbon tetrachloride solution showed 75% yield of 2,3-dihydro-2,2,4-trimethyl-7-acetoxybenzofuran.

Example 7.—Hydrolysis of 2,3-dihydro-2,2,4-trimethyl-7-acetoxybenzofuran to 2,3-dihydro-2,2,4-trimethyl-7-benzofuranol Seven grams of 2,3-dihydro-2,2,4-trimethyl-7-ocetoxybenzofuran dissolved in carbon tetrachloride (from Example 6) were taken up in 100 ml. of 1 N aqueous sodium hydroxide. The mixture was heated at 100° C. for 2½ hours. The basic solution was extracted with 25 ml. portions of ether. Acidification of the aqueous phase by hydrochloric acid to pH 4 released an oil which was taken up by two 25 ml. portions of ether. The product, isolated from the ether solutions by chromatography and elution, 2,3 - dihydro - 2,2,4 - trimethyl-7-benzofuranol, melted in the range 79–80° C.

Example 8.—Conversion of 2,3-dihydro-2,2,4-trimethyl-7 - benzofuranol to 2,3-dihydro-2,2,4-trimethylbenzofuranyl-7 N-methylcarbamate Fifteen grams of an ether solution containing 4 grams of 2,3-dihydro-2,2,4-trimethyl-7-benzofuranol were combined with 1.4 grams of methyl isocyanate in the presence of 1 drop of triethylamine. After 5 hours, the insoluble white crystalline product, 2,3-dihydro-2,2,4-trimethylbenzofuranyl-7 N-methylcarbamate, which precipitated, was isolated by filtration and air-dried. Melting point: 138.5–139.5° C.

As will be apparent to those skilled in the are, numerous modifications and variations of the embodiments illustrated above may be made without departing from the spirit of the invention.

I claim:
1. The process of preparing 2,3-dihydro-2,2,4-trimethyl-7-benzofuranol which comprises:
  (a) acetylating m-cresol to form m-cresol acetate;
  (b) rearranging m-cresol acetate, by heating to at least 165° C., to 2-hydroxy-4-methylacetophenone;
  (c) reacting 2-hydroxy-4-methylacetophenone with a methallyl halide to form 2-methallyloxy-4-methylacetophenone;
  (d) rearranging at 150–225° C. and cyclizing in the presence of a Lewis acid catalyst 2-methallyloxy-4-methylacetophenone to form 2,3-dihydro-2,2,4-trimethyl-7-acetylbenzofuran;
  (e) oxidizing 2,3 - dihydro - 2,2,4-trimethyl-7-acetylbenzofuran to 2,3-dihydro-2,2,4-trimethyl-7-acetoxybenzofuran; and
  (f) hydrolyzing the 2,3 - dihydro - 2,2,4-trimethyl-7-acetoxybenzofuran to 2,3-dihydro-2,2,4-trimethyl-7-benzofuranol.

2. The process of claim 1, wherein the acetylation of the m-cresol to m-cresol acetate is carried out by reaction with acetic anhydride in the presence of a mineral acid.
3. The process of claim 2, wherein the rearrangement of m-cresol acetate to 2-hydroxy-4-methylacetophenone is carried out under anhydrous conditions in the presence of aluminum chloride.
4. The process of claim 1 wherein the methallylation of 2-hydroxy-4-methylacetophenone to form 2-methallyloxy-4-methylacetophenone is carried out in the presence of an acid acceptor.
5. A process of preparing 2,3-dihydro-2,2,4-trimethyl-7-benzofuranol which comprises:
  (a) reacting 2-hydroxy-4-methylacetophenone with a methallyl halide to form 2-methallyloxy-4-methylacetophenone;
  (b) rearranging at 150–225° C. and cyclizing in the presence of a Lewis acid catalyst 2-methallyloxy-4-methylacetophenone to form 2,3-dihydro-2,2,4-trimethyl-7-acetylbenzofuran;
  (c) oxidizing 2,3 - dihydro - 2,2,4-trimethyl-7-acetylbenzofuran to 2,3-dihydro-2,2,4-trimethyl-7-acetoxybenzofuran; and
  (d) hydrolyzing 2,3-dihydro-2,2,4-trimethyl-7-acetoxybenzofuran to 2,3 - dihydro-2,2,4-trimethyl-7-benzofuranol.

6. The process of claim 5 wherein the rearrangement and cyclization of 2-methallyloxy-4-methylacetophenone is carried out in two separate steps.
7. The process of claim 6 wherein the rearrangement of 2-methallyloxy-4-methylacetophenone is carried out at a temperature in the range 150–225° C. to form 3-methallyl-2-hydroxy-4-methylacetophenone.
8. The process of claim 5 wherein the cyclization of 2-methallyloxy-4-methylacetophenone to 2,3-dihydro-2,2,4-trimethyl-7-acetylbenzofuran is carried out at a temperature in the range of 150°–225° C. in the presence of an acid catalyst.
9. The process of claim 8 wherein the catalyst is magnesium chloride.
10. The process of claim 5 wherein the oxidation of 2,3 - dihydro - 2,2,4-trimethyl - 7 - acetylbenzofuran to form 2,3-dihydro-2,2,4-trimethyl-7-acetoxybenzofuran is performed by an active-oxygen compound.
11. The process of claim 10 wherein the active-oxygen compound is a per-acid.
12. The process of claim 10 wherein the active-oxygen compound is peracetic acid.
13. The process of claim 5 wherein the hydrolysis of 2,3 - dihydro - 2,2,4 - trimethyl - 7-acetoxybenzofuran to 2,3-dihydro-2,2,4-trimethyl-7-benzofuranol is carried out by a strong base in the presence of water.

References Cited

UNITED STATES PATENTS 3,356,690   12/1967   Orwoll _____ 260—346.2

OTHER REFERENCES

Rosenmund et al., Annalen der Chemie, vol. 460, pp. 56–59 and 64–65 (1928).

Fieser and Fieser, Advanced Organic Chemistry, New York, Reinhold Publishing Co., pp. 42–29, copyright 1961.

ALEX MAZEL, Primary Examiner

B. I. DENTZ, Assistant Examiner

U.S. Cl. X.R.

260—999